United States Patent [19]
Saab

[11] 3,917,020
[45] Nov. 4, 1975

[54] VEHICLE SAFETY APPARATUS

[76] Inventor: Amin Melhem Saab, 1212 Main St., Houston, Tex. 77002

[22] Filed: Sept. 20, 1971

[21] Appl. No.: 181,802

[52] U.S. Cl. ................ 180/93; 293/85; 296/65 A
[51] Int. Cl.² .......................................... B60T 1/14
[58] Field of Search ................ 180/91, 92, 93, 94; 293/85, 86, 6, 7; 188/5

[56] References Cited
UNITED STATES PATENTS

| | | | |
|---|---|---|---|
| 1,372,839 | 3/1921 | Solomon | 293/85 |
| 1,459,314 | 6/1923 | Resk | 180/93 |
| 1,495,916 | 5/1924 | McNames | 188/5 |
| 1,530,400 | 3/1925 | Pagano | 180/93 |
| 1,685,467 | 9/1928 | Stockov | 180/93 |
| 2,066,468 | 1/1937 | Grigas | 180/93 |
| 2,068,278 | 1/1937 | Perillard | 180/92 |
| 2,959,446 | 11/1960 | Thompson | 296/65 A |
| 3,472,332 | 10/1969 | Halvajian | 180/93 |

FOREIGN PATENTS OR APPLICATIONS

| | | | |
|---|---|---|---|
| 102,882 | 1/1924 | Switzerland | 180/92 |
| 278,822 | 10/1927 | United Kingdom | 180/93 |

*Primary Examiner*—Kenneth H. Betts
*Attorney, Agent, or Firm*—Pravel & Wilson

[57] ABSTRACT

Apparatus for absorbing the shock of impact against a vehicle which includes a road contact shock absorber assembly mounted on the vehicle for movement into engagement with the road in response to impact with a bumper of the vehicle. A vehicle seat is released for resilient movement in response to impact against the vehicle to cushion impact against a passenger or driver. Each bumper of the vehicle has variable resistance shock absorbing means therewith.

12 Claims, 8 Drawing Figures

VEHICLE SAFETY APPARATUS

BACKGROUND OF THE INVENTION

1. Field of the Invention

The field of this invention is apparatus for absorbing the shock of impact against a vehicle.

2. Description of the Prior Art

The modern automobile has numerous safety features designed to protect a passenger or driver from personal injury. One of the most essential safety features is, of course, a brake system for stopping a moving automobile in as short a distance as possible. Unfortunately, there are occasions when the brake system is ineffective, such as when the driver applies the brakes too late or not at all.

Other safety features include seat belts and shoulder harnesses to prevent the passenger or driver from being thrown into the dashboard, steering wheel or even out of the car. However, altogether too many people neglect to use the seat belts and shoulder harnesses.

A particularly serious problem is the rear end collision in which the automobile is hit from the rear. A rear end collision may cause the head and neck regions of the passenger or driver to be thrown rearwardly. This sudden movement or lurching of the head and neck region, commonly called "whiplash," may cause temporary or even permanent injury to the neurological system. Even though the height of the back portion of vehicle seats has been increased so that the rearward movement of the head and neck region will be limited in an accident, there is still no cushioning or shock absorbing action provided to reduce the effect of the impact.

SUMMARY OF THE INVENTION

The present invention provides additional protection to a passenger or driver of a vehicle by cushioning the shock of impact against the vehicle. In one specific embodiment of this invention, a road contact bar is mounted on the vehicle by shock absorbing arms for movement into engagement with the road in response to impact with the vehicle by another vehicle or the like whereby the shock absorbing arms absorb at least a portion of the shock of such impact. In one feature of the invention, the passenger seat is mounted for yieldable movement upon release in response to impact thereby cushioning the shock of the impact on the driver or passenger in the seat.

In another feature of this invention, the impact against a bumper of a vehicle is cushioned by positioning between a bumper and the vehicle frame a variable, yieldable means which provides a yieldable resistance proportional to the magnitude of the impact.

DESCRIPTION OF THE PREFERRED EMBODIMENTS

With reference to the drawings, an apparatus A is illustrated mounted on a frame B of a vehicle C for absorbing impact against the vehicle C. The apparatus a includes a front road engaging assembly D positioned at the front E of the vehicle C and a rear road engaging assembly G positioned at the rear H of the vehicle C to absorb the shock of impact against either the front bumper I or the rear bumper J of the vehicle. For convenience, the letter F designates movement forward towards the front bumper I and the letter R designates movement rearwardly towards the rear bumper J.

The front road engaging assembly D includes a road contact member or rod 10 that is pivotally mounted onto axle 11 of the vehicle frame B by specially adapted shock absorbers 12 and 13. The rod 10 is attached to a lower arm of 12a of the shock absorber 12 by any suitable means such as welding. An upper arm 12b of the shock absorber 12 has attached thereto a sleeve 12c which is mounted over the axle 11 of the vehicle frame B. Similarly, a lower arm 13a of the shock absorber 13 is attached to the rod 10 and an upper arm 13b has attached thereto a sleeve 13c which is mounted over the axle 11. Therefore, the shock absorbers 12 and 13 mount the rod for pivotal movement about the axle 11 between a retracted position out of engagement with the road J and an extended or actuated position, which is shown in broken lines in FIG. 2, engagement with road K.

Figure 2:
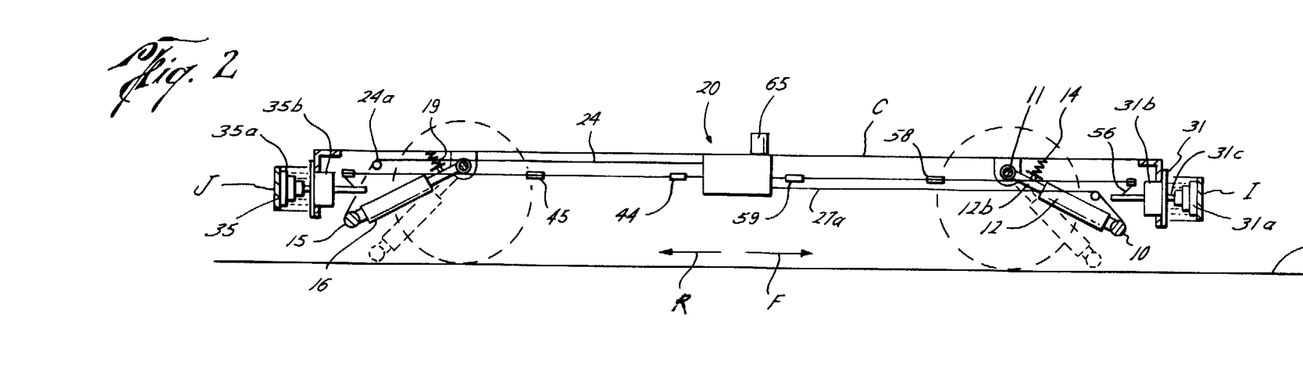
FIG. 2 is a view in elevation of the apparatus illustrating the retracted and actuated positions of the road engaging means of this invention.

As illustrated in FIG. 2, a coil spring assembly 14 is mounted onto the vehicle frame B and onto the upper arm 12b of the shock absorber 12. The coil spring 14 resiliently urges the shock absorber 12 downwardly into engagement with the road K. Similarly, another coil spring assembly (not shown) is positioned between the vehicle frame B and the upper arm 13b of the shock absorber 13 whereby the spring assemblies such as 14 cooperate to continually urge the shock absorbers 12 and 13 and the rod 10 to the position in engagement with the road K. Further, the coil spring assemblies such as assembly 14 urge the contact member 10 against the road K with a constant force even with the contact member 10 in the actuated position.

The rear road engaging assembly G is structurally similar to the front road engaging assembly D. A road contact member or rod 15 is mounted for movement between a retracted position out of engagement with the road K and an extended position illustrated in broken lines in FIG. 2 in engagement with the road K. Specially adapted shock absorbers 16 and 17 include lower arms 16a and 17a which are attached to the substantially longitudinal rod 15 by any suitable means such as welding. The shock absorber 16 includes an upper arm 16b having a sleeve 16c attached thereto, which is mounted over rear axle 18 of the vehicle frame B. The shock absorber 17 includes an upper arm 17b having a sleeve 17c attached thereto, which is also mounted over the rear axle 18. In this manner the shock absorbers 16 and 17 cooperate to mount the rod 15 for pivotal movement about the rear axle 18 between the retracted and extended positions.

As illustrated in FIG. 2, a coil spring assembly 19 is attached to the vehicle frame B and to the upper arm 16c of the shock absorber 16 to cooperate with another spring assembly (not shown) mounted between the vehicle frame B and the upper arm 17b of the shock absorber 17 to resiliently urge the rod 15 to the extended position in engagement with the road K.

An actuator means generally designated as L is mounted onto the vehicle frame B and is operably connected to the front and rear road engaging means D and G in order to actuate the road engaging means in response to impact against either of the vehicle bumpers I or J. The actuator means L includes a holding means 20 which is connected to both the front road engaging means D and the rear road engaging means G to releasably hold them in the retracted position until sensor means 21, which are mounted on both the front bumper I and the rear bumper J, releases the holding means 20 in response to impact against either of the bumpers I or J whereby the road contact rods 10 and 15 are moved into engagement with the road K.

Figure 3:
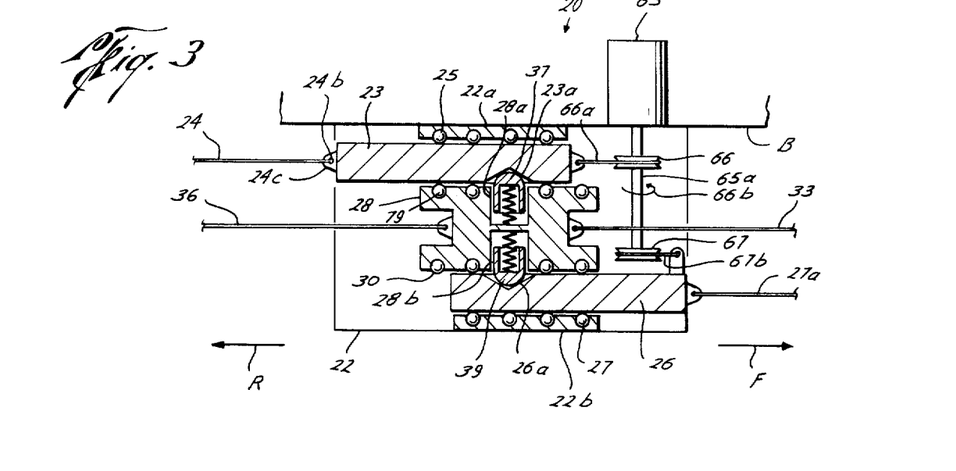
FIG. 3 is a sectional view taken along line 3—3 of FIG. 1 illustrating a holding means for releasably holding the road engaging means in a retracted position.

The holding means 20, which is illustrated in a sectional view in FIG. 3, includes a housing 22 which is mounted onto the vehicle frame B. An upper plate 23, which is attached to the rod 15 by a cable 24, is mounted against a top portion 22a of the housing 22 for movement with respect thereto by ball bearings 25. The cable 24 is attached to the rod 15 by any suitable means and extends over a pulley 24a mounted on the vehicle frame B and is attached to the upper plate 23 by any suitable means such as being tied to through a hole 24b in a stud 24c on upper plate 28.

Similarly, a lower plate 26 is mounted onto a bottom portion 22b of the housing 22 for movement with respect thereto by ball bearings 27. The lower plate 26 is connected to the rod 10 by a cable 27a which extends over a pulley 27b mounted on the vehicle frame B. An actuator member 28 is positioned between the upper plate 23 and the lower plate 26 for movement with respect to both of the plates 23 and 26 by upper ball bearings 29 and lower ball bearings 30. The actuator member 28 is attached to front bumper sensors 31 and 32 which will be described in detail hereinafter, by cables 33, 33a and 33b. The actuator member 28 is attached to rear bumper sensors 34 and 35, which will also be described in detail hereinafter by the cables 36, 36a and 36b. Thus, with the releasable holding means 20 in a retracted position as illustrated in FIG. 3, the upper plate 23 is holding the rod 15 in the retracted position by means of cable 24 and the lower plate 26 is holding the rod 15 in the retracted position by means of cable 27a.

The rods 10 and 15 must be held in the retracted position because the rod 10 is urged toward the extended position by the springs such as spring 14 and by the weight of the rod 10 and the shock absorbers 12 and 13. The rod 15 is urged downwardly to the extended position by the weight of the rod itself and shock absorber arms 16 and 17 and, further by the force of the springs such as spring 19. To maintain the upper plate 23 and the lower plate 26 in the retracted position, the actuator member 28 includes an upper detent 37 which is mounted in a recess 28a in the actuator member 28 and is urged upwardly by coil spring 38 into a recess 23a in the upper plate 23 thereby holding the upper plate 23 in the retracted position. A lower detent member 39 is mounted in a recess 28b in the actuator member 28 and is resiliently urged outwardly by coil spring 40 into a recess 26a in the lower plate member 26 to hold the lower plate member 26 in the retracted position.

Figure 4:
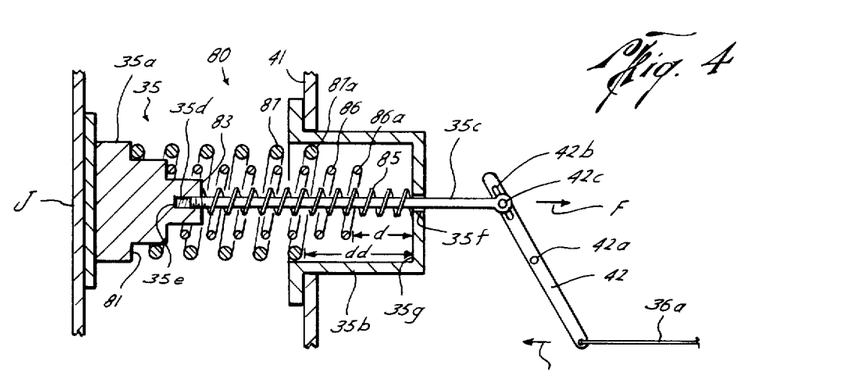
FIg. 4 is a sectional view taken along line 4—4 of FIg. 1 illustrating the bumper shock absorbing mechanism of this invention.

The sensors 34 and 35 are mounted onto the rear bumper J in order to move the actuator member 28 rearwardly in response to impact against the rear bumper J and release the upper plate 23 and the lower plate 26 from the retracted position so that the rods 10 and 15 are moved downwardly into engagement with the road K. The sensor 35, which is illustrated in detail in FIG. 4, includes a plunger 35a which is welded otherwise mounted on the inside of the bumper J. A sensor housing section 35b is mounted onto a rear frame support 41 by any suitable means and, a plunger rod 35c, which includes a threaded end portion 35d, is mounted in a corresponding threaded hole 35e in the plunger 35a. The plunger rod 35c extends through a hole 35f in the sensor housing section 35b so that movement of the rear bumper J in response to an impact causes the plunger 35a and the plunger rod 35c to move in the forward direction F.

an actuator rod 42 is pivotally mounted onto the vehicle frame B by a pin 42a. The plunger rod 35c is mounted in a slot 42b in the upper end of the actuator rod 42 by a pin or bolt 42c so that horizontal movement of the plunger rod 31c in the forward direction F causes the actuator rod 42 to be pivoted in a clockwise direction about the pin 42a.

The cable 36, which is attached to the actuator plate 28, is connected to cables 36a and 36b. The cable 36a is attached to the lower end of the actuator rod 42 and is mounted for movement on pulleys 44, 45 and 46, which are mounted for rotation on the vehicle frame B for rotation.

The sensor 35 actuates the rod 15 for movement downwardly into engagement with the road K in the following mannner. whenever an impact against the rear bumper J occurs sufficiently near to the sensor 35 to cause the plunger rod 35c to move in the forward direction F, the actuator rod 42 is pivoted clockwise and the cables 36a and 36 are pulled in the rearward direction R. The pulling cables 36 and 36a pulls or moves the actuator member 28 in the rearward direction R thereby causing the actuator member 28 to release the upper and lower movable plates 23 and 26 so that the rods 10 and 15 are moved downwardly into engagement with the road K. The manner in which the actuator member 28 actually releases the rods 10 and 15 will be described in more detail hereinafter.

Figure 1:
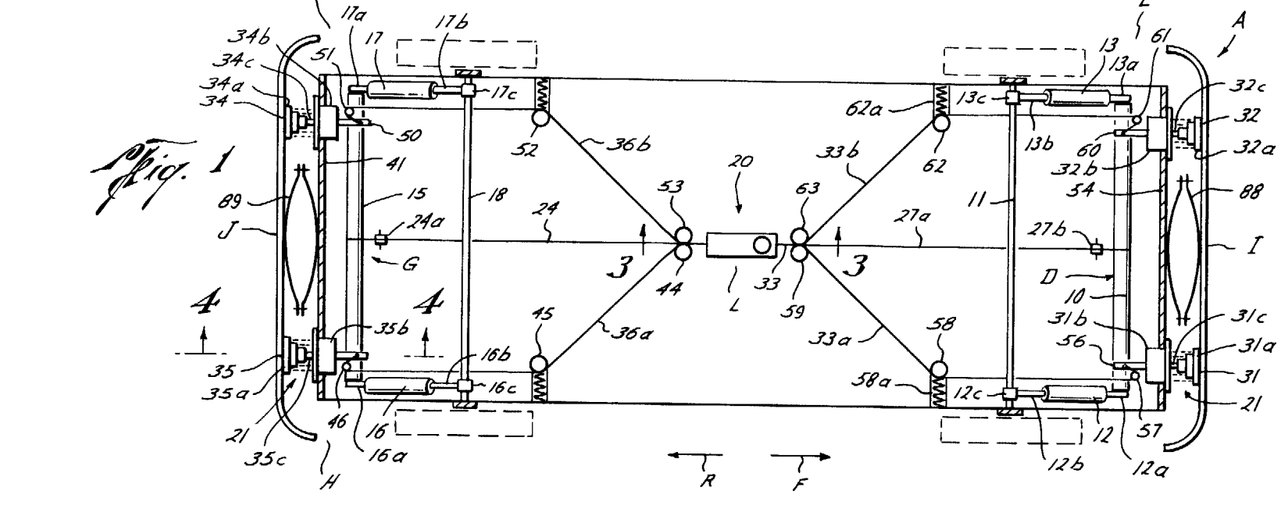
FIG. 1 is a schematic view of the shock absorbing apparatus of a preferred embodiment of this invention mounted on a vehicle.

The other rear sensor 34 includes a plunger 34a mounted on the rear bumper J opposite a sensor housing 34b mounted on the rear frame support 41. A plunger rod 34c is mounted with the plunger 34a and extends through the sensor housing 34b and is attached to an actuator rod 50. The actuator rod 50 is mounted on the vehicle frame B and functions similarly to actuator rod 42 and is attached to the cable 36b which is connected to the cable 36, the cable 36 being attached to the actuator plate 28. The cable 36b is mounted for movement on pulleys 51, 52 and 53 which are schematically illustrated in FIG. 1 mounted on the vehicle frame B. Thus impact against the rear bumper J near the sensor 34 causes movement of plunger rod 34c in the forward direction F thereby causing the actuator rod 50 to pull the cables 36b and 36 in the rearward direction R and thus move the actuator member rearwardly.

The front sensors 31 and 32 are attached to cable 33, which is connected to the actuator member 28, by the cables 33a and 33b, respectively, in order to move the actuator member 28 in the forward direction F in response to impact against the front bumper I. The sensor 31 includes a plunger 31a mounted on the front bumper I and a sensor housing 31b mounted on front frame support 54. A plunger rod 31c is attached to the plunger 31a and extends through the sensor housing 31b and is connected to an actuator rod 56. The actuator rod 56 is attached to the cable 33a such that movement of the plunger rod 31c in response to impact against the front bumper I causes the cables 33a and 33 to pull the actuator member 28 with forward direction F. The cable 33a is mounted for movement on pulleys 57, 58 and 59, which are mounted on the vehicle frame B for rotation.

Similarly, the front bumper sensor 32 includes a support 32a mounted on the front bumper I and a sensor housing 32b mounted on the frame support 54. A plunger rod 35c is attached to the support 32a and extends through sensor housing 32b and is connected to an actuator rod 60. The actuator rod 60 is attached to the cable 33b, which is attached to cable 33 whereby movement of the plunger rod 32c in response to impact against the front bumper I causes the cables 33b and 33 to pull the actuator member 28 in the forward direction F. The cable 33b is mounted for movement on the frame pulleys 61, 62 and 63.

The operation and use of the shock absorbing apparatus A will now be described in detail. In response to an impact, for example, against the rear bumper J, the plunger rod 35c of the plunger 35 is moved in the forward direction F causing the actuator rod 42 to rotate clockwise thereby pulling the cables 36a and 36 and the actuator member 28 in the rearward direction R. Since the upper movable plate 23 is urged in the rearward direction R by the weight of the rod 15 itself and the springs such as 19, the movement of the actuator member 28 rearwardly allows the upper plate 23 to be moved therewith which allows the rod 15 through the cable connection 24 to the upper plate 23 to be lowered into engagement with the road K.

The movement of the actuator plate 28 in the rearward direction R causes the lower detent member 39 to be moved out of the recess 26a in the lower movable plate 26 so that the rod 10 is moved downwardly into engagement with the road K as the lower movable plate 26 is moved forwardly under the force of the springs such as 14 and the weight of the rod 10 and the shock absorbers 13 and 14. Therefore, both rods 10 and 15 are moved down into engagement with the road K in response to the impact which caused the sensor 35 to move or actuate the actuating member 28.

Since the movement of the actuating member 28 in the rearward direction R causes the cables 33, 33a and 33b to be pulled rearwardly, the pulleys 58 and 62 are resiliently mounted by means of coil springs 58a and 62a, respectively, to allow the cables 33a and 33b to move inwardly at the point of movable contact with the pulleys 58a and 62a thereby eliminating strain on the actuator rods 56 and 60 of the front bumper sensors 31 and 32.

The engagement of the rods 10 and 15 with the road K in response to impact absorbs the shock of the impact in the following manner. The initial impact is directed in the forward direction F against the rear bumper J and causes the sensor 35 to actuate and lower the rods 10 and 15 into engagement with the road K. The shock absorbers 12 and 13 cushion at least a portion of the shock of the initial impact against the rear bumper J. In response to this initial impact exerted against the shock absorbers 12 and 13, the shock absorbers 12 and 13 transmit a force of reaction, which is less in magnitude than the initial impact due to the cushioning effect of the shock absorbers 12 and 13, in the rearward direction R to the vehicle frame B and thus to the shock absorbers 16 and 17.

The shock absorbers 16 and 17 absorb a portion of the rearwardly directed force of reaction from the shock absorbers 12 and 13, and exert a reaction force in the forward direction F.

The shock absorbers 12 and 13 and the shock absorbers 16 and 17 continue to cushion oscillating forces caused by the impact and the reaction to impact by the shock absorbers until the shock has subsided. Thus the impact against the vehicle B is quickly dissipated. Also, the engagement of the rods 10 and 15 with the pavement serves to stabilize and stop the movement of the vehicle to even further protect the passenger or driver therein.

In a similar manner, an impact against the front bumper I may cause the sensor 31 to pivot the actuator rod 56 and pull the cables 33a and 33 and actuator member 28 in the forward direction F which also moves downwardly the rods 10 and 15 into engagement with the road K. The movement of the actuator member 28 forwardly through the cables 33a and 33 causes the lower movable plate 26 to move forwardly. Since the weight of the rod 15 and the springs such as 19 continually urge the upper plate 23 rearwardly through the cable 24, the movement of the actuator member 28 forwardly causes the upper detent 37 to be moved out of the recess 23a in the upper movable plate 23 thus allowing the rod 15 to be moved downwardly into engagement with the road. The shock absorbers 16 and 17 initially react to damp or cushion effect of shock of the impact against the front bumper I and exert a reaction force forwardly along the vehicle frame B. This is partially absorbed or damped by the shock absorbers 12 and 13 which in turn exert rearwardly a lesser force of reaction. This oscillation and reduction of the impact continues until the impact exerted against the rear bumper initially has been dissipated. It is also within the scope of this invention to utilize the front bumper sensors 31 and 32 to actuate only the rear road engaging means G so that only the rod 15 will be lowered into engagement with the rod K in response to impact against the front bumper I. The lowering of a single rod 15 into engagement with the road K in response to impact against the front bumper I serves to cushion the vehicle B against at least the initial shock to the vehicle frame. Also the rear sensors 34 and 35 may be used in conjunction with the front road engaging means D to lower the front rod 10 into engagement with the road in response to impact against the rear bumper J. The lowering of the rod 10 into engagement with the road K in response to impact against the rear bumper J serves to cushion the initial shock against the vehicle frame B from an impact against the rear of the vehicle c.

After the apparatus A has cushioned the shock of the impact against the vehicle C utilizing both the front shock absorbers 12 and 13 with the rod 10 attached thereto and the rear shock absorbers 16 and 17 with the rod 15 attached thereto, the releasable holding means 20 may be positioned for use again by activating an electric motor 65 so that the upper movable plate 23 and the lower movable plate 26 may be returned to the retracted position of FIG. 3. A pulley 66 is mounted onto electric motor shaft 65a and is attached to the upper movable plate 23 by a cable 66a whereby rotation of the electric motor shaft 65 in a counter-clockwise direction 66b moves the upper movable plate 23 forwardly to the retracted position where the upper detent 37 is seated in the recess 23a in the upper movable plate 23. A pulley 67 is mounted onto the electric motor shaft 65a and is attached to the lower movable plate 26 by the cable 67b such that the counter-clockwise rotation of the electric motor shaft 65a returns the lower movable plate to the retracted position where the lower detent member 39 is seated in the recess 26a.

Figure 6:
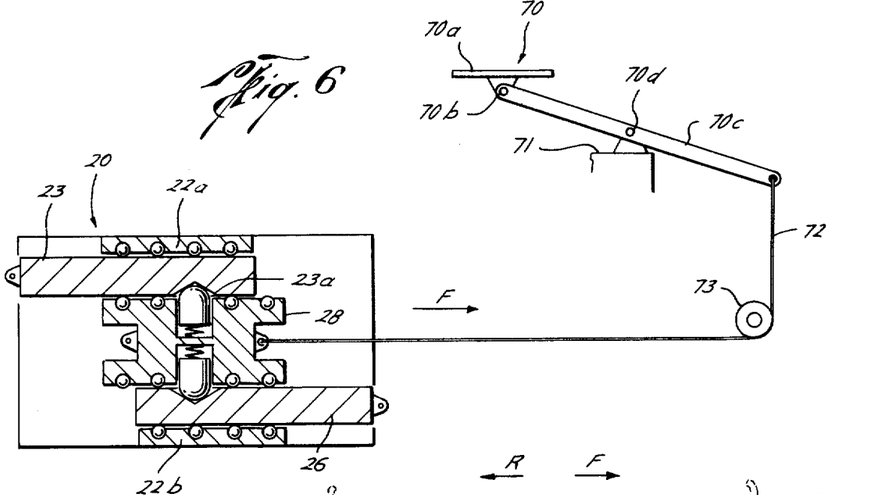
FiG. 6 is a schematic view partially in section of a means for manually actuating the road engaging means of this invention.

If desirable, the apparatus A may be adapted so that the rollers 10 and 15 will be lowered into engagement with the road K manually. Referring to FIG. 6, the releasable holding means 20, which is identical to the releasable holding means of FIG. 3 and thus like numbers and letters will be used for like elements, is illustrated schematically attached to a pedal assembly designated generally as 70 which may be mounted on the floorboard 71 of the car. The pedal assembly 70 includes a pedal 70a which is pivotally attached by means of a pin 70b to a lever 70c. The lever 70c is pivotally attached by means of pin 70d to the floorboard 71 of the vehicle C. The lower end of the lever 70c is attached to a cable 72 at 70e. A cable 72 extends from an end of the lever 70c, about a pulley 73, which is schematically illustrated as being mounted on the vehicle frame B, and is connected to the actuator plate 28. Whenever the driver of the vehicle C desires to actuate the road engaging means D and G, such as in an emergency, the lever 70c is pivoted clockwise by the application of the driver's foot to the pedal 70a thereby pulling the cable 72 and thus the actuator member 28 in forward direction F such that the upper movable plate 23 and the lower movable plate 26 are released, thus lowering the rods 10 and 15 into engagement with the road K in a manner previously described.

In addition to the shock absorbing action of the rods 10 and 15 with the shock absorbers attached thereto, the effect of the rods 10 and 15 being urged into contact with the road K by the springs 14 and 19 serves to stabilize the vehicle C and arrest the motion of the vehicle. Often a vehicle spins out of control after a collision and collides again, such as with another vehicle. The contact of the rods 10 and 15 with the road will resist movement of the car in any direction thereby controlling spin and slowing down the vehicle at the same time.

The stabilizing and the braking effect of the rods 10 and 15 are also very useful for driving on slippery roads, such as roads covered with ice or snow. The driver simply manually actuates the releasable holding means 20 by pushing the pedal 70a when the vehicle begins to skid so that the lowered rods 10 and 15 will stabilize and brake the vehicle.

Figure 5:
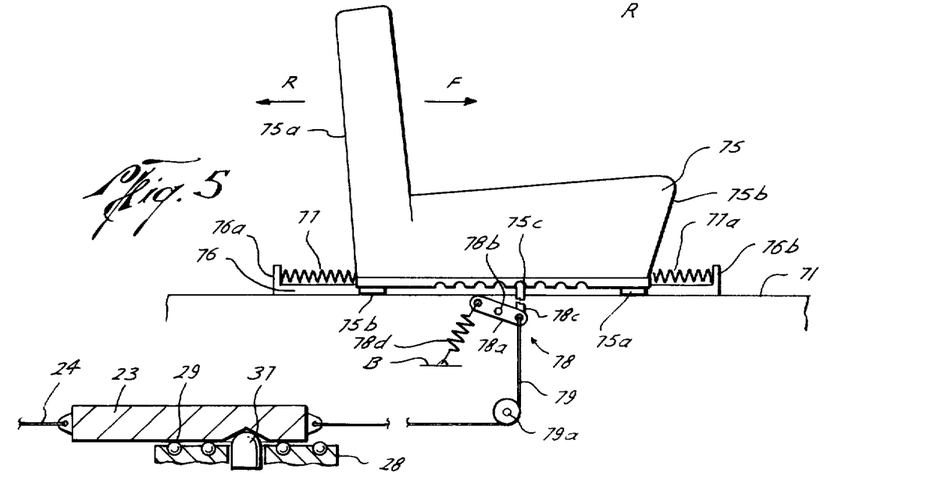
FIG. 5 is a schematic view in elevation of a resiliently mounted passenger seat of this invention.

An additional feature of this invention which is illustrated in FIG. 5 is provided for cushioning the impact against a driver or passenger of the vehicle C by resiliently mounting a vehicle seat 75 for yieldable movement on the floorboard 71 of the vehicle C. The vehicle seat 75 includes bottom studs 75a and 75b which are mounted in a track 76 attached to the floorboard 71 so that the vehicle seat 75 is slidable in the track 76. A rear coil spring 77 is positioned between the rear end 76a of the track 76 and the back 75a of the vehicle seat 75 to resiliently mount the vehicle seat for yieldable movement in the rearward direction R in response to an impact against the rear of the car. Similarly, a coil spring 77a is positioned between front end 76b of the track 76 and the front 75b of the vehicle seat 75 to mount the passenger seat 75 for yieldable movement in the forward direction F in response to impact against the front of the car.

During normal operation the passenger seat 75 is held in a fixed position by the releasable means 78 which is illustrated schematically as including a pivoting arm 78a mounted on the vehicle frame B for pivotal movement by a pin 78b. A locking stud 78c is attached to one end of the pivoting arm 78a and extends vertically upwardly into a slot 75c machined in the bottom of the vehicle seat. An extension spring 78d is illustrated as schematically attached to the vehicle frame B and to the other end of the pivotal arm 78a in order to urge the locking stud 78c into the slot 75c. To release the locking stud 78c from engagement with a slot 75c in the seat, a cable 79 is attached to the pivoting arm 78a and extends about a pulley 79a, which is mounted on the vehicle frame B, and is connected to the upper movable plate 23 of the releasable holding means 20 which also hold the rods 10 and 15 in a retracted position as previously described.

When an emergency condition arises such as when there is impact against the front bumper I or the rear bumper J and one of the sensors 31, 32, 34 or 35 moves the actuator plate 28 and thus releases the upper movable plate 23 for movement in the rearward direction R, the cable 79 pulls the locking stud 78c out of the slot 75c in the vehicle seat 75 thereby releasing the vehicle seat 75 and the driver or passengers seated therein for yieldable movement in response to the impact. For instance, if the vehicle C has received an impact against the rear bumper J, the upper movable plate 23 is moved rearwardly thereby releasing the vehicle seat 75 so that the passenger seat 75 moves rearwardly further compressing the spring 77. This yieldable rearward movement of the vehicle seat against the spring 77 dampens or reduces the shock against the driver or passenger in the seat. Of course, the driver or passenger should be strapped in the seat such as by seat belts (not shown) mounted on the seat 75. The cushioning effect upon an impact against the rear J of the vehicle C tends to reduce the likelihood of injury, particularly a whiplash injury to the passenger or driver.

If the vehicle C receives an impact against the front bumper I, either the sensor means 31 or 32 causes the actuator member 28 to release the upper movable plate 23 so that the upper movable plate 23 can move rearwardly thus pivoting the locking stud 78c out of engagement with the slots 75c such that the vehicle seat is freed for resilient movement forwardly, the forward movement of the seat 75 being cushioned by the resilient spring 77a.

It is noted that in the schematic illustration of FIG. 5, the vehicle seat is not movable forwardly as far as rearwardly so that the driver will not crash into the steering wheel or a passenger into the dashboard. It is also noted that the locking stud 78c is shown in broken lines illustrating that the position of the pivoting lever 78a may be somewhat lower so that it will not interfere with the releasing of the vehicle seat 75 for resilient movement. It may also be desirable to combine the manual release mechanism 70 illustrated in FIG. 6 with the resilient vehicle seat 75 of FIG. 5 so that the vehicle seat is manually releasable for yieldable movement.

As an additional feature of this invention, each of the sensors 31, 32, 34 and 35 are provided with a yieldable means 80 for cushioning the impact against the bumpers I and J. In the sensor 35 of FIG. 4, the plunger 35a includes spaced shoulders 81, 82 and an end face 83. A coil spring 85 is mounted about the plunger rod 31c and is positioned to engage in compression the end face 83 of the plunger 31a and the inside wall 31f. The coil spring 85 provides a yieldable resistance to impact against the rear bumper J to damp or cushion at least a portion of the impact against the bumper J. The diameter of the coil spring 85 and the size of the wire of the coil spring is small so that the spring 85 cushions against only relatively light impacts.

To provide additional yieldable resistance for larger impacts, coil spring 86 is mounted onto shoulder 82 of the plunger by any suitable means such as welding. The coil spring 86 has a larger diameter than the coil spring 85 and the size of the wire of spring 86 is larger than that of the coil spring 85. The length of the coil spring 86 is such that end 86a of the coil spring 86 does not engage inside wall 35g of the sensor housing 35b until the impact against the rear bumper J is sufficiently large to move the bumper I and plunger 35a a distance d before the coil spring 86 is compressed. Since the coil spring 86 is larger than the coil spring 85, once the end 86a of the coil spring is in engagement with the wall 31f of the sensor housing 31b, the larger coil spring 86 offers a stronger yieldable resistance to impact than coil spring 85 thus cushioning the effect of a larger impact against the bumper J.

Finally, an even larger coil spring 87 is mounted onto shoulder 81 of the plunger 35a by any suitable means. The size of the wire of the coil spring 87 is larger than that of the coil spring 86 and the diameter of the coil spring is larger also. The length of the coil spring 87 is such that end 87a is positioned normally a distance dd from the inside housing wall 35f of the sensor housing 35b such that the end 87a is only moved into engagement with the inside wall 35f when the impact against the rear bumper J is sufficiently large to have moved the bumper I and the plunger 35a the distance dd. Once the largest coil spring 87 is engaged with the inside wall 31f, the spring 87 offers the strongest yieldable resistance to the impact and thus serves to cushion or reduce the shock or effect of the impact. It is understood that whenever the impact on the bumper J is so large that the largest coil spring 87 is moved into engagement with the inside wall 35f of the sensor housing 35b, that the medium sized coil spring 86 and the smallest coil spring 85 are also compressed to yieldably resist the impact. By positioning these various sizes of springs as described herein, the sensor 35 include an effective means for providing a yieldable resistance which is proportionate to the magnitude of the impact against the bumper J.

A similar cushioning means 80 is mounted onto each of the other sensors 31, 32 and 34; however, since the cushioning means 80 is identical for all of the sensors, only the details of the cushioning means 80 for the sensor 35 has been described.

A double-leaf spring 88 is mounted between the front bumper I and the front frame support 54 to further cushion an impact against the front bumper I. A double-leaf spring 89 is positioned between the rear bumper J and the rear frame support 41 to cushion the effect of impact against the rear bumper J.

Figure 7:
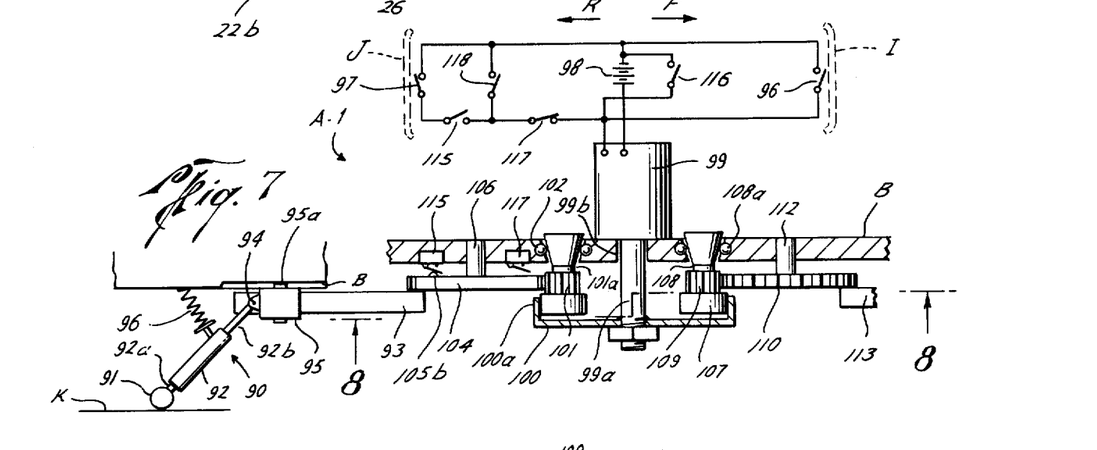
FIG. 7 is a schematic view partially in section of an alternate embodiment of this invention in which a road engaging means is electrically actuated.
Figure 8:
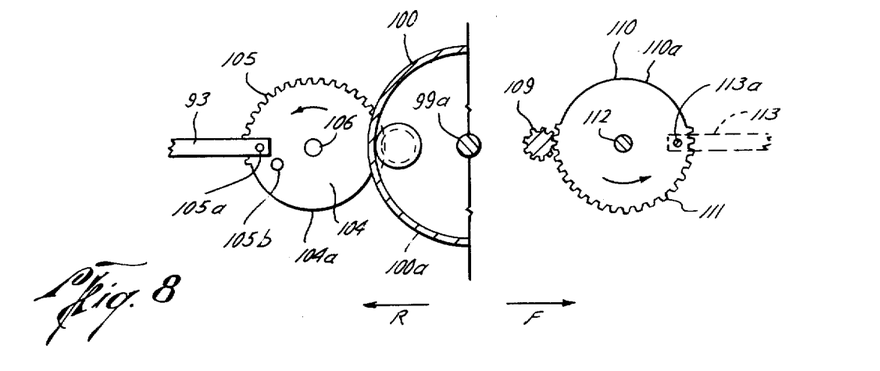
FIg. 8 is a bottom view taken along line 8—8 of FIG. 7 illustrating the gear driving mechanism for the alternate embodiment of FIG. 7.

An alternate embodiment A-1 of the apparatus A of this invention is illustrated in FIGS. 7 and 8. In the alternate embodiment A-1, rear road engaging means 90 includes a road contact member or rod 91 which is attached to shock absorber arms such as 92 which in the extended position of FIG. 7 absorb impact against the vehicle. The rod 91 is attached to lower arm 92a of the shock absorber 92 by any suitable means such as welding or perhaps a nut and bolt combination. An upper arm 92b of the shock absorber arm 92 is pivotally attached to an actuator arm 93 by a universal joint 94.

The actuator arm 93 is slidably mounted in a sleeve 95 which is pivotally attached to the vehicle frame B by any suitable means such as pins 95a whereby the sleeve is mounted for pivotal lateral movement. A compressed coil spring 96 is attached to vehicle frame B and the shock absorber 92 to continually urge the shock absorber arm 92 and thus the longitudinal rod 91 downwardly into engagement with the road K. Another shock absorber arm (not shown) is attached to the other side of the vehicle frame B and to the rod 91 and is mounted for slidable movement in a sleeve (not shown) identical to sleeve 95 whereby the rod 91 is movable between the extended position of FIG. 7 and a retracted position. In the retracted position the upper arm 92b of the shock absorber 92, as well as the upper arm of the other shock absorber (not shown) is positioned within sleeves such as 95 so that the longitudinal rod 91 is held out of engagement with the road K.

The rear road engaging means 90 and the front road engaging means (not shown) for the apparatus A-1 is moved into engagement with the road K in response to impact against the front bumper I or the rear bumper J in a manner similar to the apparatus A except that the apparatus A-1 is electrically actuated rather than mechanically actuated. An electric sensor 96, which is illustrated in a schematic circuit in FIG. 7, is mounted onto the vehicle frame B at the front bumper I and another electrical sensor 97 is mounted at the rear bumper J. Both the sensors 96 and 97 are normally open switches which are in series with a power source 98 and a reversible motor 99 which is mounted onto the vehicle frame B.

An electric motor shaft 99a extends through a hole 99b in the vehicle frame B and, a driving disc 100 is welded or otherwise mounted onto the end of the electric motor shaft 99a. The driving disc 100 has an upstanding peripheral edge 100a to engage and rotate a rubber roller 101. The rubber roller 101 is mounted on a shaft 101a which is mounted for rotation by ball bearings 102 on the vehicle frame B.

A pinion 103 is mounted on the shaft 101a such that rotation of the rubber roller 101 will cause rotation of the pinion 103. A gear wheel 104 which has approximately one-half of its outer edge 104a machined with gear teeth 105, is mounted by shaft 106 on the vehicle frame B for rotation with respect thereto. The gear teeth 105 of the gear wheel 104 are engaged by the pinion 103. The actuating arm 93 is pivotally mounted onto the gear wheel by a pin 105a.

The upstanding edge 100a of the disc 100 also engages another rubber roller 107 which is mounted onto shaft 108 for rotation therewith. The shaft 108 is mounted by ball bearings 108a for rotation on the vehicle frame B and, a pinion 109 is mounted onto the shaft 108 whereby rotation of the rubber roller 107 causes the pinion 109 to rotate. The pinion 109 is positioned to engage a gear wheel 110 having gear teeth 111 machined in approximately one-half of its outer edge 110a. The gear wheel 110 is mounted onto the vehicle frame for rotation by a shaft 112. An actuator arm 113 for the front road engaging means (not shown) is pivotally mounted on the gear wheel 110 by a pin 113a.

The apparatus A may be operated or used in the following manner. If the rear bumper j receives an impact, the electric sensor 97 closes so that power is applied to the electric motor 99. The motor 99 rotates the shaft 99a and the disc 100 clockwise. Rotation of the disc 100 clockwise causes the rubber roller 101 and thus the pinion 103 to also rotate clockwise. The pinion engages the gear teeth 105 on the gear wheel 104 causing the gear wheel 104 to rotate counterclockwise thus moving the actuator arm 93 in the rearward direction R so that the upper arm 92b of the shock absorber 92 is moved substantially out of the sleeve 95 to the position of FIG. 7. As the upper arm 92b is moved out on the sleeve 95, the weight of the shock absorber 92 and the rod 91, and the force of the compressed coil spring 96 urges the shock absorbers 92 to pivot downwardly about the universal joint 94. Of course, the other shock absorber arm (not shown) attached to the rod 91 is also moved out of a sleeve (not shown) whereby the rod 91 is moved downwardly into engagement with the road K.

For the front road engaging means (not shown), in response to the impact against the rear bumper J, the rubber roller 107 is rotated clockwise by the clockwise rotation of the disc 100 such that the pinion 109 is rotated clockwise. Rotation of the pinion 109 clockwise causes the gear wheel 110 to rotate counterclockwise thus moving the actuator arm 113 in the forward direction F so that the front road engaging means, which is identical to the rear road engaging means 90, is moved to an actuated position in engagement with the road K.

If the impact occurs against the front bumper I, the switch 96 is closed thus closing the circuit with the power supply 98 therein such that the electric motor 99 rotates the disc 100 clockwise causing the rod 91 and a rod (not shown) of the front road engaging means (not shown) of the vehicle C to be moved into engagement with the road K. Therefore, the road engaging means such as 90 for the alternate embodiment A-1 are moved into engagement with the road K in response to impact against either of the bumpers I or J.

The gear wheel 105 includes a stud 105b which, when the rod 91 had been moved downward into engagement with the road K, opens limit switch 115 (in a manner well known) thereby opening the circuit to the electric motor 99 and stopping the movement of the gear assembly including the disc 100, the pinions 103 and 109, and the gear wheels 104 and 110 to prevent undue stress thereon.

After the apparatus A-1 has been used, the road engaging means such as the rear road engaging means 90 may be retracted from engagement with the road K by closing reversing switch 116 which electrically connects the power supply 98 to the electric motor 99 to cause the electric motor 99 to drive the disc 100 counterclockwise thereby rotating the gear wheels 104 and 110 clockwise such that the actuator arms 93 and 113 and the shock absorbers such as 92 attached thereto, are moved inwardly to a retracted position. After the gear wheel 104 is rotated sufficiently to retract the actuator arm 93, a limit switch 117 mounted on the vehicle frame B will be opened by the stud 105b thus shutting off power to the reversible motor 99 after the rods such as the rod 91 are moved out of engagement with the road.

If desired, a driver or passenger in the vehicle B can operate the apparatus A-1 manually by a switch 118 which is mounted on the dashboard of the vehicle C. The closing of the switch 118 closes the circuit with the power supply 98 and the motor 99 therein so that the disc 100 is rotated clockwise to move the rods such as 91 into engagement with the road in a manner already described.

The foregoing disclosure and description of the invention are illustrative and explanatory thereof, and various changes in the size, shape, and materials as well as in the details of the illustrated construction may be made without departing from the spirit of the invention.

I claim:

1. Apparatus for stabilizing a vehicle under emergency conditions, comprising:
    front road engaging means for mounting at the front of said vehicle for movement between a retracted position and an actuated position in which said front road engaging means engages the road to stabilize said vehicle;
    rear road engaging means for mounting at the rear of said vehicle for movement between a retracted position and an actuated position in which said rear road engaging means engages the road to stabilize said vehicle;
    front and rear sensor means for mounting at the front and rear of said vehicle, respectively, for operable connection with said front and rear road engaging means for releasing said front and rear road engaging means for movement to said actuated positions in response to an impact against either the front or the rear of said vehicle; and
    said front and rear road engaging means including absorber means attached to said vehicle for absorbing the shock of said front and rear road engaging means in engagement with said road.

2. The structure set forth in claim 1, in which said front and rear sensor means includes:
    yieldable means disposed between said vehicle frame and bumper for providing a variable, yieldable resistance to impact against said bumper in proportion to the magnitude of impact against said bumper whereby at least a portion of impact is cushioned.

3. The structure set forth in claim 2 in which said yieldable means includes:
    a plurality of springs of various sizes disposed between said bumper and said vehicle frame whereby one or more of said springs, in response to impact against said bumper, is moved into yieldable engagement with said vehicle frame whereby a greater yieldable resistance is provided in response to a greater impact against said bumper.

4. The structure set forth in claim 1, including:
    cushion means mounting a seat in said vehicle for yieldable movement in response to impact against said vehicle whereby, upon impact, a passenger in said seat is yieldably moved with said seat such that said passenger is cushioned against at least a portion of said impact.

5. The structure set forth in claim 4 including:
releasable means for releasably holding said passenger seat in a fixed position prior to impact against said vehicle and for releasing said passenger seat for yieldable movement in response to impact.

6. The structure set forth in claim 4 in which said cushion means includes:
rear resilient means mounting said passenger seat for yieldable movement rearwardly in response to impact against the rear of the vehicle.

7. The structure set forth in claim 4 in which said cushion means includes:
front resilient means mounting said passenger seat for yieldable forward movement in response to impact against the front of the vehicle.

8. The structure set forth in claim 1, including:
a. electric power means mounted on said vehicle frame for moving said road engaging means from said retracted to said actuated position; and
b. said front and rear sensor means each comprising electrical switch means mounted on a bumper of said vehicle and electrically connected to said electric power means for electrically actuating said electric power means in response to impact against said bumper.

9. The structure set forth in claim 8 in which said electrical power means includes:
a. an electric motor mounted on said frame; and
b. gear means mounted on said motor and in driving engagement with said road engaging means whereby rotation of said motor moves said road engaging means between extended and retracted positions.

10. The structure set forth in claim 9 in which said road engaging means includes:
a. a road contact rod;
b. absorber arms attached to said rod; and
c. sleeves mounted on said vehicle for slidably mounting said absorber arms, said absorber arms being disposed in said sleeves in said retracted position and disposed substantially out of said sleeves in said actuated position; and
d. said gear means attached to said absorber arms for moving said absorber arms substantially out of said sleeves to said actuated position.

11. The structure set forth in claim 1, including:
said actuator means including:
a. resilient means urging said road engaging means to said actuated position in engagement with said road;
b. a first member mounted on said vehicle for movement, said first member being operably attached to said road engaging means;
c. a second member mounted on said first member for movement with respect thereto;
d. detent means mounted with said second member and extending into contact in said first member, whereby said first member is held retracted against movement and said road engaging means is held in said retracted position against the urging of said resilient means;
e. sensor means mounted on a bumper of said vehicle and attached to said second member for sensing impact against said bumper and moving said second member in response thereto thereby releasing said detent means from holding said first member against movement whereby said resilient means moves said road engaging means to said actuated position; and
retracting means mounted on said vehicle and connected to said first member for moving said first member to a retracted position in which said detent means holds said first member against movement.

12. Apparatus for stabilizing a vehicle under emergency condition, comprising:
road engaging means mounted on a vehicle for movement between a retracted position and an actuated position in which said road engaging means engages the road to absorb the shock impact against such vehicle and to stabilize said vehicle; and
actuator means operably connected to said road engagement means for placing said road engagement means in said actuated position in response to impact against said vehicle, said actuator means including:
resilient means urging said road engaging means to said actuated position in engagement with said road;
a first member mounted on said vehicle for movement, said first member being operably attached to said raod engaging means;
a second member mounted on said first member for movement with respect thereto;
detent means mounted with said second member and extending into contact in said first member, whereby said first member is held retracted against movement and said road engaging means is held in said retracted position against the urging of said resilient means; and
sensor means mounted on a bumper of said vehicle and attached to said second member for sensing impact against said bumper and moving said second member in response thereto thereby releasing said detent means from holding said first member against movement whereby said resilient means moves said road engaging means to said actuated position.

* * * * *